United States Patent
Noessing et al.

(10) Patent No.: US 8,102,970 B2
(45) Date of Patent: Jan. 24, 2012

(54) METHOD AND APPARATUS FOR LINE TESTING

(75) Inventors: Gerhard Noessing, Villach (AT); Alberto Canella, Villach (AT)

(73) Assignee: Lantiq Deutschland GmbH, Neubiberg (DE)

(*) Notice: Subject to any disclaimer, the term of this patent is extended or adjusted under 35 U.S.C. 154(b) by 1346 days.

(21) Appl. No.: 11/489,131

(22) Filed: Jul. 18, 2006

(65) Prior Publication Data

US 2008/0025476 A1 Jan. 31, 2008

(51) Int. Cl.
H04M 1/24 (2006.01)
H04M 3/08 (2006.01)
H04M 3/22 (2006.01)

(52) U.S. Cl. .............. 379/30; 379/22; 379/24

(58) Field of Classification Search .............. 379/1.01, 379/14.01, 15.05, 22, 22.03, 22.07, 24, 27.01, 379/27.04, 29.01, 29.03, 29.04, 30
See application file for complete search history.

(56) References Cited

U.S. PATENT DOCUMENTS

| | | |
|---|---|---|
| 3,904,839 A | 9/1975 | Peoples |
| 4,634,964 A | 1/1987 | Chattler |
| 5,202,882 A | 4/1993 | Rudolf |
| 5,625,667 A | 4/1997 | Vogt, III et al. |
| 5,867,557 A | 2/1999 | D'Andrea et al. |
| 5,870,451 A | 2/1999 | Winkler et al. |
| 5,881,129 A | 3/1999 | Chen et al. |
| 5,881,130 A | 3/1999 | Zhang |
| 6,453,016 B1 | 9/2002 | Chea, Jr. |
| 6,519,322 B1 * | 2/2003 | Ludeman ............ 379/27.01 |
| 6,587,544 B2 * | 7/2003 | Nossing et al. ........... 379/26.01 |
| 6,590,962 B1 * | 7/2003 | Groessl et al. ........... 379/14.01 |
| 6,909,781 B1 | 6/2005 | Itri |
| 2002/0101980 A1 | 8/2002 | Ayoub et al. |
| 2002/0114444 A1 | 8/2002 | Anderson et al. |
| 2002/0118819 A1 | 8/2002 | Li |
| 2002/0141542 A1 * | 10/2002 | Angliss et al. ............ 379/26.02 |
| 2004/0062361 A1 | 4/2004 | Kamali et al. |
| 2004/0109540 A1 | 6/2004 | Forsberg |
| 2005/0117732 A1 | 6/2005 | Arpin |
| 2005/0258841 A1 * | 11/2005 | Blechschmidt et al. ...... 324/713 |
| 2006/0193444 A1 | 8/2006 | Aufenast et al. |
| 2007/0230667 A1 | 10/2007 | Warner et al. |

FOREIGN PATENT DOCUMENTS

| | | |
|---|---|---|
| EP | 0 808 053 | 11/1997 |
| EP | 0 580 947 | 5/1998 |
| EP | 1 219 097 | 4/2005 |

OTHER PUBLICATIONS

Office Action for U.S. Appl. No. 11/117,075 dated Jan. 12, 2009 (13 pages).
Office Action for U.S. Appl. No. 11/117,075 dated Aug. 10, 2009 (7 pages).
Office Action for U.S. Appl. No. 11/489,376 dated May 7, 2010 (9 pages).
Office Action for U.S. Appl. No. 11/489,376 dated Oct. 13, 2010 (10 pages).

* cited by examiner

Primary Examiner — Quoc D Tran
(74) Attorney, Agent, or Firm — Slater & Matsil, L.L.P.

(57) ABSTRACT

A method of testing a communication line includes measuring a first voltage/current couple on the communication line, measuring a second voltage/current couple different from the first couple on the communication line, and calculating a resistance based on the first couple and the second couple.

40 Claims, 4 Drawing Sheets

METHOD AND APPARATUS FOR LINE TESTING

CROSS-REFERENCE TO RELATED APPLICATIONS

This application is related to commonly assigned U.S. patent application Ser. No. 11/489,376, filed on even date herewith, entitled "METHOD AND APPARATUS FOR LINE TESTING," which is herein incorporated by reference.

BACKGROUND

In wired communication networks, terminal devices located in the premises of a customer (also referred to as subscriber) are connected with a central office via communication lines. An example for such a communication network is a public switched telephone network (PSTN). The corresponding telephone service is referred to as plain old telephone service (POTS). In such a case, terminal devices like telephones or facsimile devices, and also data transfer devices are connected with the central office via a pair of copper lines. The copper lines are commonly referred to as tip line and ring line. In the central office, the copper lines are typically connected with a subscriber line interface circuit (SLIC) on a corresponding line card, which in this case is referred to as a PSTN (or POTS) line card.

In the central office, a line testing procedure is typically regularly performed, to detect errors in the lines (e.g., broken lines) and also to identify if a telephone, a fax, or any other terminal device is connected to the line.

A further error or fault which may occur with such communication lines is the accidental connection of such a communication line with a line of another copper pair or other communication line, which may happen for example when communication lines are buried in the ground or when coupling connection lines in some switching device. Such faults are also referred to as a connection of the communication line to a foreign voltage, because in use a certain voltage is typically applied to communication lines.

Such a connection to a foreign voltage is often referred to as "(low) resistance to battery" or "(low) insulating resistance to battery," because in this case a low ohmic equivalent resistance connects the wire or communication line with a different wire on which a battery voltage is typically applied (e.g., 48 V is typical in PSTN networks).

As explained above, such a connection of a communication line to a foreign voltage may occur at numerous different locations between and including the central office and the customer's premises. Consequently, there is a need for a method and an apparatus for line testing wherein the location of such a fault can be determined as precisely as possible.

Furthermore, in general line testing is typically performed with dedicated line testing equipment which is coupled to the communication lines to be tested. Such dedicated line testing equipment requires space. Furthermore, since often one such dedicated line testing equipment is used for a large number of lines, line testing typically is only performed at larger intervals, for example every seven days. Finally, such dedicated testing equipment is connected via switching elements (e.g., relays) to the communication line, which result in additional costs.

For these and other reasons, there is a need for the present invention.

SUMMARY

One embodiment provides a method of testing a communication line including measuring a first voltage/current couple on the communication line, measuring a second voltage/current couple different from the first couple on the communication line, and calculating a resistance based on the first couple and the second couple.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments relate to a method and an apparatus for line testing of communication lines.

Some embodiments provide line testing equipment for detecting a foreign voltage connection which does not require additional space and which facilitates line testing being performed in shorter intervals in an effective manner.

One embodiment of a method for line testing includes measuring a first voltage/current couple on a communication line, measuring a second voltage/current couple on the communication line, and calculating a resistance based on the first voltage/current couple and the second voltage/current couple.

In this respect, a voltage/current couple generally designates a voltage which is present on the communication line when the respective current of the couple is present and vice versa.

One embodiment of an apparatus for line testing include a measure configured to measure a first voltage/current couple and a second voltage/current couple on a communication line. The apparatus includes a calculation calculate a resistance based on the first voltage/current couple and the second voltage/current couple.

Figure 1:
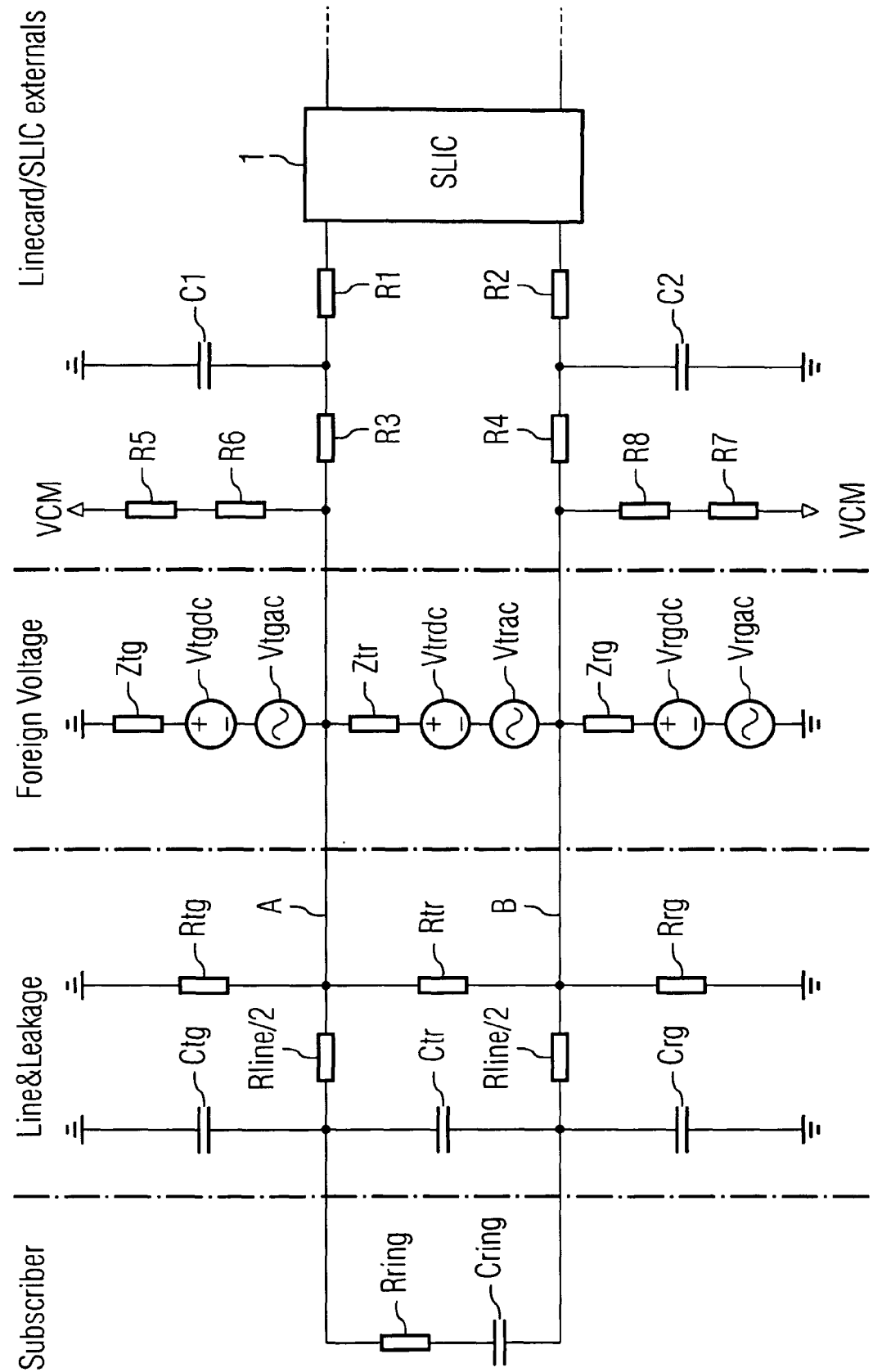
FIG. 1 illustrates an equivalent circuit of a PSTN communication line comprising a tip line and a ring line.

FIG. 1 illustrates one embodiment of an equivalent circuit for a tip line A and a ring line B of a copper line pair between a line card located in a central office and a subscriber (terminal device).

The line card comprises a subscriber line interface circuit (SLIC) 1. As explained further below in detail, line cards may comprise a plurality of such subscriber line interface circuits and also the elements such as coder/decoders (CODECs).

In the illustrated embodiment, the tip line A is connected to the SLIC 1 via resistors R3 and R1, whereas ring line B is connected to the SLIC 1 via resistors R4 and R2. Example suitable values are 30Ω for resistors R1 and R2 and 20Ω for resistors R3 and R4. Furthermore, capacitances C1 and C2 are connected between tip line and ring line, respectively, on the one hand and ground on the other hand. An example suitable value for capacitors C1 and C2 is 15 nF.

Resistors R1 through R4 stabilize and protecting the SLIC and together with capacitors C1 and C2 form filters for filtering out unwanted frequency components.

Furthermore, tip line A is coupled with a common mode voltage VCM via resistors R5 and R6, and ring line B is connected with common mode voltage VCM via resistors R8 and R7. Example suitable values are 10 MΩ for resistors R6 and R8 and 47 kΩ for resistors R5 and R7. Therefore, as resistors R6 and R8 have large values, practically no current flows between tip line A and VCM and ring line B and VCM. However, as will be explained later in more detail, in one embodiment R5 and R6 as well as R8 and R7 serve as voltage dividers which enable a measurement even of large voltages on tip line A and ring line B.

On a subscriber side (i.e., at a far end of the tip line A and the ring line B in customer's premises) a terminal device is present, represented by a resistance Rring and a capacitance Cring in FIG. 1. The values of Rring and Cring may change depending on a state of the terminal device, in particular an off-hook state where the device is active, for example when the subscriber receives a telephone call, and an on-hook state, when the device is not active (i.e., no sending or receiving activity is present in the device). Note that the representation of the terminal device in FIG. 1 is somewhat simplified, and additional elements, such as breakthrough diodes, additional resistors and capacitors parallel to the one illustrated may be present in a full equivalent circuit diagram (also referred to as "signature" of the terminal device).

However, the exact circuit diagram of the terminal device is not needed for explaining embodiments of the present invention, and therefore to simplify and clarify FIG. 1 such further elements are omitted.

In a section designated "line and leakage" in FIG. 1 two resistances each designated Rline/2 are illustrated representing the resistance of tip line A and ring line B, such that the overall resistance of the line is Rline.

Leakage resistances and capacitances are also illustrated in the "line and leakage" section of FIG. 1, namely Rtg as a leak resistance between tip line A and ground, Ctg as a leak capacitance between tip line A and ground, Rrg as a leak resistance between ring line B and ground, Crg as a leak capacitance between ring line B and ground, Rtr as a leak resistance between tip line A and ring line B, and Ctr as a leak capacitance between tip line A and ring line B. In a fault free state, the resistances Rtg, Rrg and Rtr are very large (e.g., several tens of MΩ), and the capacitances Ctg, Crg and Ctr are comparatively small (e.g., in the order of 47 nF per km of the line). Therefore, no significant direct current (DC) and only small alternating current (AC) currents may flow via these connections.

Finally, a section designated "foreign voltage" is illustrated in FIG. 1. The "foreign voltage" section represents the situation when, as described in the Background section, tip line A and/or ring line B accidentally comes in contact with a tip line or a ring line of another communication line or with some other element to which a voltage is applied. This may happen when, during connection of the lines, lines are erroneously connected with each other although they belong to separate circuits, when insulation around lines is damaged for example when putting the lines into the ground, or in other circumstances. In this case, the tip line A, the ring line B or both are connected with a foreign voltage, which is the voltage of the line with which the tip line A or the ring line B has unwanted contact. In FIG. 1, the connection of tip line A with such a foreign voltage is represented by a AC voltage source Vtgac, a DC voltage source Vtgdc, and an impedance Ztg. Likewise, a connection between ring line B and a foreign voltage is represented by an AC voltage source Vrgac, a DC voltage source Vrgdc and an impedance Zrg. Finally, if both tip line A and ring line B are accidentally connected with a further communication system, this may lead to a foreign voltage being effectively coupled between tip line A and ring line B, which in FIG. 1 is represented by a DC voltage source Vtrdc, an AC voltage source Vtrac, and an impedance Ztr.

In the following, embodiments for checking whether such a connection to a foreign voltage exists and for localizing such a connection are described. The embodiments described in the following are not concerned with measuring further properties of tip line A and ring line B like leakages represented in the section "line and leakages" in FIG. 1 or properties of the terminal device, but measuring further properties are described in the above incorporated patent application. However, the embodiments described may be easily combined with or implemented together with devices and methods also measuring these properties simply by performing the necessary measurements one after the other.

Figure 2:
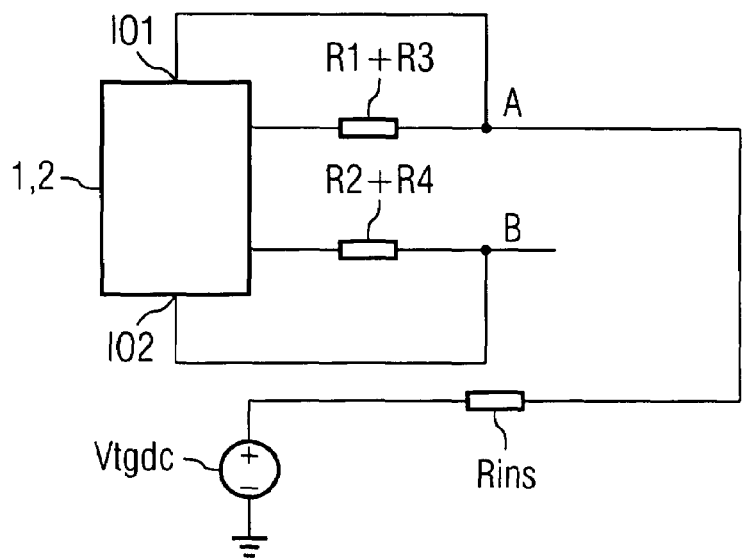
FIG. 2 illustrates a measurement principle of one embodiment.
Figure 3:
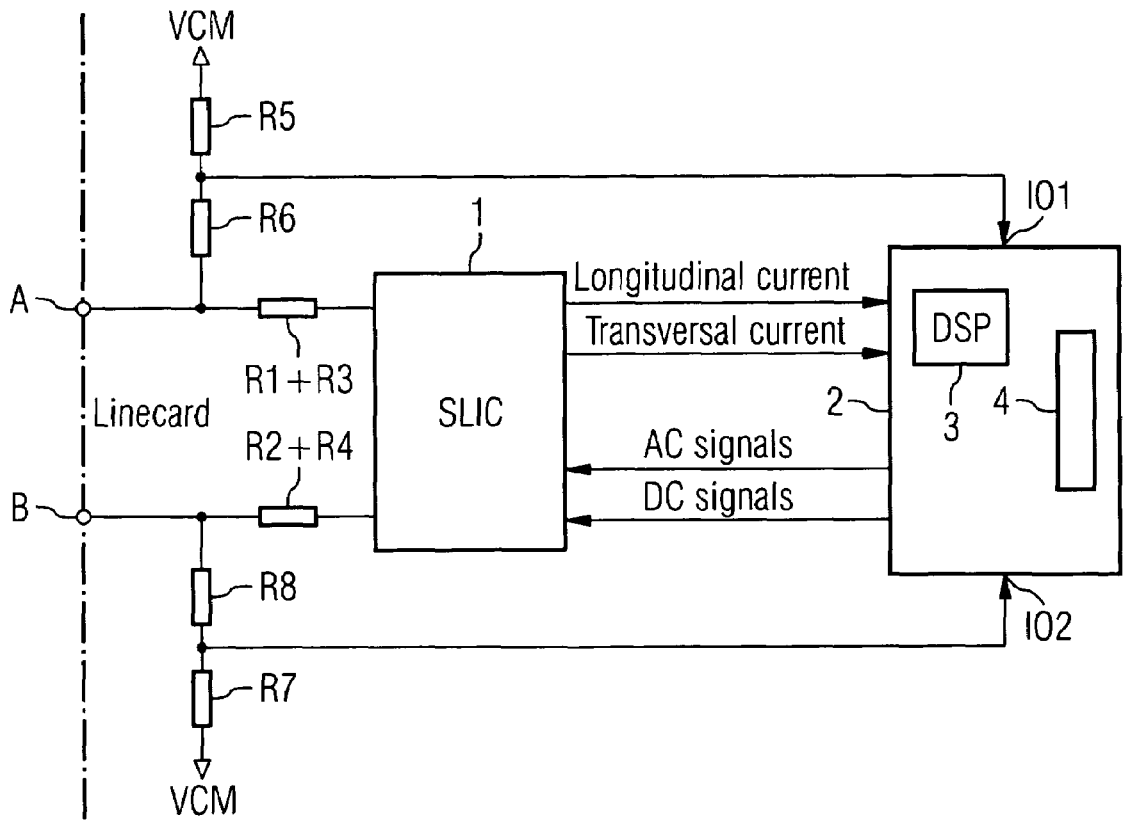
FIG. 3 is a block diagram of one embodiment.
Figure 4:
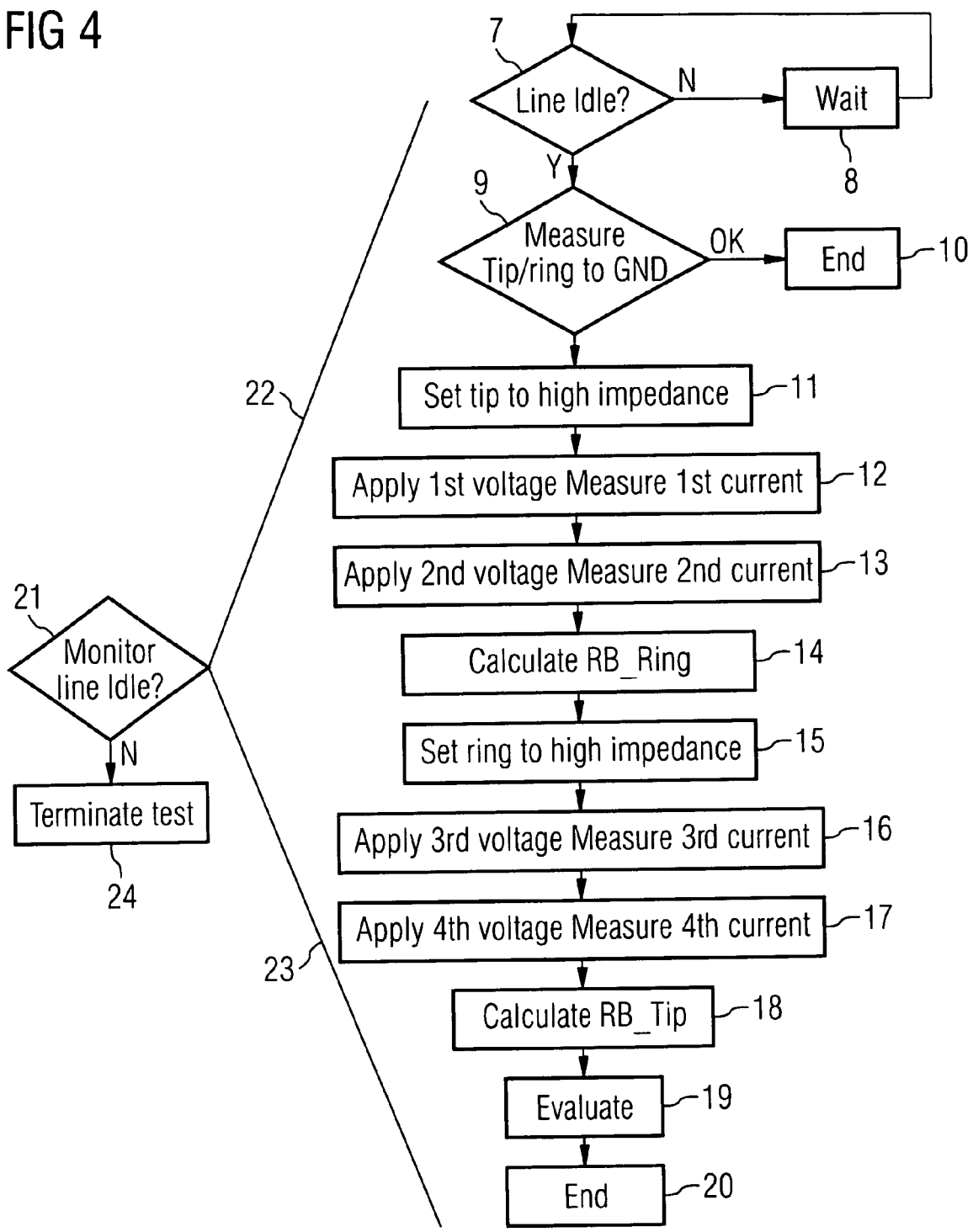
FIG. 4 illustrates one embodiment of a method.

Such an embodiment for checking whether such a connection to a foreign voltage exists and for localizing such a connection will now be described with reference to FIGS. 2-4, wherein FIGS. 2 and 3 illustrate the physical implementation and FIG. 4 illustrates a method performed for measuring.

For line testing, the illustrated embodiment generally applies a voltage to the tip line A or the ring line B and measures a current flowing via the respective line. While in principle it would be possible to implement embodiments of the present invention with dedicated test equipment, in the embodiment illustrated in the following the intrinsic properties and capabilities of elements used in line cards is used for implementing the illustrated embodiments.

In particular, as already explained with reference to FIG. 1 on a line card a subscriber line interface circuit 1 is provided at which tip line A and ring line B terminates. Furthermore, typically a CODEC 2 is provided for coding and/or decoding the signals received or sent over tip line A and ring line B, which nowadays typically involves digital-to-analog or analog-to-digital conversion. An example for such a CODEC is Infineon's VINETIC™ Chip. In FIG. 2, SLIC 1 and CODEC 2 are represented as a single block, whereas in the more detailed circuit diagram of FIG. 3 they are represented as separate units.

Current SLICs usually have the capability of generating and measuring currents, whereas many CODECs have the capability of measuring voltages, for example via dedicated pins, which in case of FIGS. 2 and 3 are designated IO1 and IO2. Also, a SLIC may be used to apply a voltage to tip line A and ring line B.

Therefore, the equipment present on a line card, in particular SLIC 1 and CODEC 2, may be used to perform also measurements for line testing, in particular measurements for checking whether and where the line is connected with a foreign voltage.

The complete setup is illustrated in FIG. 3. In particular, SLIC 1 measures both longitudinal currents (i.e., a current on line A or B) and transversal currents (i.e., a current between line A and B) and forwards this information to CODEC 2. CODEC 2, on the other hand, provides AC signals and DC signals to SLIC 1 to be output on tip line A and/or ring line B. CODEC 2 furthermore, as explained above, measures a voltage on line A and/or line B via pins IO1 and IO2, respectively. As voltages on such communication lines may become very large, the already mentioned voltage dividers comprising resistors R5, R6 in case of tip line A and R8, R7 in case of ring line B are employed to scale the voltage to a level which may be easily handled by CODEC 2.

As further illustrated in FIG. 3, CODEC 2 may comprise a digital signal processor 3 and an analog-to-digital converter (not illustrated). With this converter, the voltages measured on pins IO1 and/or IO2 and the longitudinal current and transversal current forwarded by SLIC1 are converted into digital data which may be easily processed by digital signal processor 3. Furthermore, a digital-to-analog converter (also not illustrated) converts desired voltage and/or current values to be output on tip line A and ring line B into analog signals, forwards the same as AC signals or DC signals to SLIC 1 which in turn outputs these signals via line drivers incorporated in SLIC 1 on tip line A and ring line B.

As further illustrated in FIG. 3, in the illustrated embodiment, CODEC 2 also comprises an interface 4 for interfacing with a host in which the corresponding line card is installed. According to an embodiment control software or firmware for performing one embodiment of a method described further below is downloaded or otherwise installed in that host, and the host then controls SLIC 1 and CODEC 2 for performing the necessary measurements and also analyzes the results of these measurements.

For performing the measurement, it is desirable to measure only tip line A or only tip line B. In the illustrated embodiment, this may be done by setting a corresponding line driver of SLIC1 to a high impedance state. Alternatively, a switch may be provided for disconnecting tip line A or ring line B. A corresponding measurement situation is illustrated in FIG. 2. Here, ring line B is "disconnected", for example by setting the line driver for ring line B to a high impedance state. Tip line A, in the example illustrated in FIG. 2, is erroneously connected with a foreign voltage source, in this case a DC voltage source Vtgdc. Between the location where tip line A is connected with the line card and the voltage source Vtgdc a resistance Rins is present, which comprises both the line resistance up to the location where Vtgdc is connected with tip line A and a possible external protection element the resistance of which is a known value, for example 50 ohm.

Next, one embodiment of a method which may be implemented with the measurement equipment of FIGS. 2 and 3 as described above by downloading a corresponding software or firmware into a host hosting the line card on which SLIC1 and CODEC 2 of FIG. 3 are located is described with reference to FIG. 4.

At 7, the line to be tested is checked to determine if it is in an idle state. An idle state in this case designates a state where a terminal device on the far end of the line is not active (i.e., in the on-hook state). In the on-hook state, the terminal device, such as a telephone, on the far end of the line terminates with a large capacity Cring as illustrated in FIG. 1, and consequently no DC current flows although the line card supplies a voltage (e.g., 48 V which is the standard voltage between tip line A and ring line B) and which voltage usually provides a power supply for the terminal device. If the line is not idle, at 8 it is waited for a certain time, for example half an hour, and then step 7 is repeated, since it is generally not desirable to perform any line testing while a terminal device at the far end of the line is used since this could for example interrupt a conversation between the subscriber and another subscriber.

If it is found at 7 that the line is idle, at 9 the tip and ring voltages with respect to ground are measured, which may for example be accomplished via the pins IO1 and IO2 as illustrated in FIGS. 2 and 3. This first measurement is performed to check the initial state of the line. If these voltages correspond to expected voltages, for example to voltages which have been measured at an earlier time when the line was in a fault-free state or a voltage known from other lines to be the correct voltage, this is an indication that no connection to a foreign voltage is present. Therefore, in this case, the method is terminated at 10.

In case the measured values do not correspond to the expected values at 9, at 11 the tip line is set to a high impedance state as explained above (e.g., by setting the line driver of the tip line to a high impedance state or by disconnecting tip line A in some other manner).

After that at 12 a first voltage V1 is applied to the ring line B, and a first current I1 is measured on the ring line B, which, since the tip line is set to a high impedance state, is a longitudinal current. Applying the voltage and measuring the current is effected as already descried with reference to FIGS. 2 and 3. A possible value for the first voltage is 10 V.

Therefore, a first voltage/current couple with the first voltage V1 and the measured first current I1 is obtained.

At 13, the measurement at 12 is repeated with a second voltage V2 different from the first voltage V1, for example a voltage of 20 V, and a corresponding second current I2 is measured. Therefore, a second voltage/current couple with second voltage V2 and second current I2 is obtained.

The method proceeds at 14 with the calculation of a resistance RB_ring which corresponds to a resistance between the location where the measurements are performed (i.e., the line card) which is a known location, and the foreign voltage. In particular, if Vbat is the foreign voltage, for the measurement performed at 12 the following equation holds true:

$$I1=(V1-Vbat)/RB\_ring \quad (1)$$

whereas for the measurement performed at 13

$$I2=(V2-Vbat)/RB\_ring \quad (2)$$

holds true. Combining equations (1) and (2) yields $$RB\_ring=abs((V1-V2)/(I1-I2)), \quad (3)$$

so that RB_ring can be calculated without knowing the magnitude of Vbat. The absolute value (represented by the operator abs in equation (3)) does not have to be formed when the voltages and the currents V1, V2, I1, I2 are measured taking their sign into account.

In steps 15-18, the same procedures performed in steps 11-14 are repeated with reversed parts for the tip line and the ring line. In particular, at 15, the tip line is set to a normal state again, and the ring line is set to a high impedance state. At 16, a third voltage V3 which may have the same magnitude as the first voltage V1, for example 10 V, is applied to the tip line A, and a corresponding third current I3 is measured, which at 17 is repeated for a fourth voltage V4 and a fourth current I4. At

18, RB_tip is calculated which represents an overall resistance between the line card and a foreign voltage connected to tip line A according to $$RB\_tip = abs((V3-V4)/(I3-I4)) \quad (4)$$

which corresponds to equation (3) for the ring line. At 19, the results obtained are evaluated. This may be accomplished, as explained above, in a host hosting the line card where SLIC 1 and CODEC 2 are installed. In particular, if RB_ring has a high value, for example above 1 MΩ, this means that the ring line is well isolated from other lines and no problem exists. The same holds true for the tip line if RB_tip has a correspondingly large value. Otherwise, a low ohmic result indicates that there is a coupling to an external battery or other foreign voltage.

Moreover, based on the result for RB_ring and/or RB_tip, it may be calculated how far this connection is from the line card (i.e., the central office) which is a known location. In particular, the wires or cables used for the tip lines and ring lines have a given and known resistance per length unit.

For the calculation of the distance, at first resistances like resistances R1-R4 in FIG. 3 or known external resistances have to be subtracted from RB_ring or RB_tip. As an example, if the measured value of RB_ring is 190Ω and the resistances R2 plus R4 amounting to 50Ω are subtracted, an effective resistance of 140Ω results. If for example a 0.4 mm wire which typically has a resistance of 280Ω/km is used, it follows that the coupling to the foreign voltage Vbat is 500 m from the line card, which permits a, comparatively precise locating of the location where a repair has to be done. In particular, with the method discussed, it is possible to determine the resistances RB_ring and RB_tip with an accuracy of about 3%, with a corresponding accuracy for the distance. This is in particular due to the fact that through the measurement of two voltage/current couples for each resistance, in the present embodiment current and/or voltage offsets or the battery voltage are canceled out which leads to a more precise measurement.

At the end of the evaluation, the host may output the calculated data, for example on a screen (not illustrated) or a printer (also not illustrated) to inform service personnel.

After that at 20 the method is terminated.

Furthermore, during the whole method as indicated by lines 22 and 23 a monitoring is performed which continuously monitors whether the line continues to be idle. This may for example be done by monitoring the currents on tip line A and/or ring line B. As discussed above, if the subscriber for example initiates a call and the terminal device goes to an off-hook state, the impedance at the far end of the line and therefore the line current suddenly changes, which may be detected by a current measurement. If the line turns not to be idle any more, at 24 the method is terminated. Therefore, it is ensured that the subscriber does not notice the test, but may use his terminal device freely.

Note that numerous modifications may be performed to the method of FIG. 4 without departing from the scope of the present invention, some of which will be discussed below.

For example, the order of steps 11-14 and steps 15-18 may be reversed so that RB_tip is calculated before RB_ring. Furthermore, if the voltage measurements at 9 indicate that only in one of the tip line and the ring line a connection to a foreign voltage may be present, only the measurement steps for the respective line have to be performed.

On the other hand, it is also possible to omit step 9 altogether and perform the measurement procedure in any case.

Furthermore, steps 7 and/or 27 may be omitted, in particular in case there is reason to believe that a severe fault is present which may damage equipment and/or the line, for example if the subscriber has already informed the respective service provider that communication is impeded or even impossible. In such a case, without steps 7 and 28 the test is run irrespective of whether the subscriber wants to use his terminal device.

Additionally, the calculation steps 14 and 18 may also be performed together after all the measurements have been carried out.

Furthermore, instead of applying a voltage and measuring a current at 12, 13, 16 and 17, it is also possible to apply a current and measure the corresponding voltage, which leads to the same voltage/current couples.

A further alternative in this regard will be now discussed with reference to FIG. 5 which illustrates a current limiting function of one embodiment.

The embodiment explained with reference to FIG. 5 uses a current limitation mechanism to limit the currents during the measurement procedure to given values. Such a current limitation mechanism, in connection with line cards also designated line regulation loop, is present in many modern programmable line cards and during normal operation, to regulate a voltage on the line depending on the load in order to get a desired current. For example, every VINETIC™ CODEC of Infineon has such a current regulation mechanism.

In particular, this mechanism may be used to regulate the current to a value which is smaller than typical off-hook currents (i.e., currents which occur when a terminal device is in an off-hook state). Moreover, the current limit should be chosen such that the current is well below a current limit normally used during operation such that a current regulation mechanism of the circuit of the foreign voltage does not become active, which may lead to two regulations working against each other.

Figure 5:
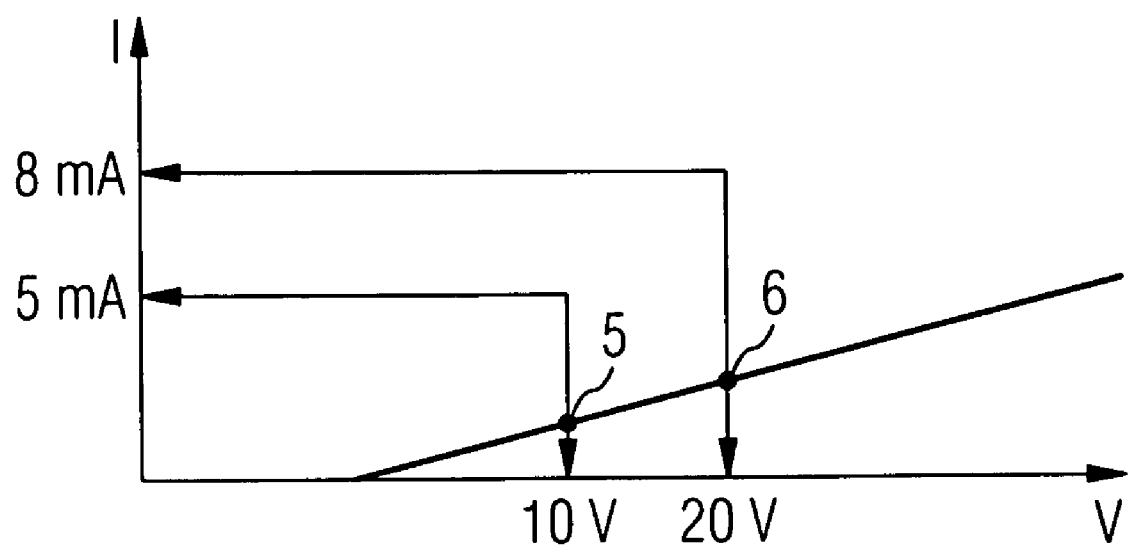
FIG. 5 is an exemplary diagram illustrating the current limiting function of one embodiment.

An example given in FIG. 5 is a current limit or also a desired limit of 5 mA for the first voltage/current couple and the third voltage/current couple (steps 12 and 16) and a current of 8 mA for the second and fourth voltage/current couples (steps 13 and 17). As illustrated in FIG. 5, if the currents are set as desired currents, this corresponds to the situation already mentioned above where the current is given and the voltage is measured. On the other hand, it is also possible to use these currents as a limit and, if the currents with the applied voltages, for example 10 V and 20 V, leads to measurement points 5 and 6 having currents below the limit, the current is measured as described first with reference to FIG. 4.

This is the situation illustrated in FIG. 5, where the measurement points 5 and 6 have a current below 5 mA and 8 mA, respectively.

Note that the measurements described above are DC measurements (i.e., a DC voltage is applied and a DC current is measured). In case the foreign voltage Vbat is not a normal battery voltage, but an AC voltage for some reason, the measurement of the current has to be averaged over a sufficiently long time (i.e., several periods of the alternate voltage) to obtain a net direct current.

Note that the order of measurements in FIG. 4 is not fixed. In particular, the first voltage may be a higher voltage than the second voltage. Additionally, it is possible first to perform measurements with a first voltage on both lines and then with a second voltage on both lines (i.e., first steps 12 and 16) and then steps 13 and 17, in which case the tip line and ring line are changed more often between the high impedance state and the normal state.

Note that after RB_ring has been calculated following equation (3), Vbat may be calculated from equation (1). This may be done for further confirming that a foreign voltage is present and also to determine the type of foreign voltage (e.g., by checking whether Vbat is a typical voltage applied to a communication line).

As already indicated, the line testing described above may be performed by itself or together with further measurements for measuring further properties of the line, for example further capacitance and/or resistance values as indicated in FIG. 1.

Although the embodiment described above uses a SLIC and a CODEC present on a line card for carrying out the measurements, dedicated test equipment may also be used, for example test equipment having a current generator, a current measurement device, a voltage generator, and a voltage measurement device. The embodiment using the SLIC and the line card has the advantage that no dedicated equipment is necessary and each line has, with the SLIC and the CODEC, its own test equipment, so tests may be performed in shorter intervals. On the other hand, with an embodiment in the form of dedicated test equipment, also lines with older SLICs and CODECs which do not provide the necessary functions may be tested.

Embodiment of the present invention are not limited to the use in PSTN equipment, but other communication lines may be measured with the same method and similar devices. In case the communication runs over a single line (in contrast to the two copper lines of a PSTN network), it is of course not necessary to set a line into a high impedance state, and the measurements may be carried out directly.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of testing a communication line, the method comprising:
   measuring a first voltage/current couple on the communication line including limiting current on the communication line to below a first current threshold during the measuring;
   measuring a second voltage/current couple different from the first couple on the communication line including limiting current on the communication line to below a second current threshold during the measuring;
   calculating a resistance based on the first couple and the second couple; and
   terminating the method if a terminal device connected to the communication line goes to an off-hook state.

2. The method according to claim 1, comprising:
   determining that a connection to an erroneously connected element is present if the resistance is below a threshold value.

3. The method according to claim 2, wherein the threshold value is at least 1 Megaohm.

4. The method according to claim 1, comprising:
   determining a further resistance between a known location and an element erroneously connected to the communication line based on the resistance.

5. The method of claim 4, comprising:
   determining a distance between the known location and the erroneously connected element based on the further resistance.

6. The method according to claim 1, comprising:
   continuously monitoring if the terminal device connected to the communication line goes to an off-hook state.

7. The method according to claim 1, wherein the communication line comprises a pair of wires, the method comprising:
   setting one wire of the pair of wires to a high impedance state; and
   measuring the first couple and the second couple on the other wire of the pair of wires.

8. The method according to claim 1, wherein measuring the first couple and measuring the second couple comprises controlling a line card to which the communication line is connected to perform the measuring.

9. The method according to claim 1, wherein the first and the second current thresholds are different.

10. The method according to claim 1, wherein the first and the second current thresholds are substantially the same.

11. The method according to claim 1 comprising:
    setting the first and the second current thresholds below a threshold for off-hook detection for a terminal device.

12. The method according to claim 1 comprising:
    setting the first and the second current thresholds significantly below a normal operating current limit.

13. A method of testing a communication line, the communication line comprising a first wire and a second wire, the method comprising:
    setting the first wire to a high impedance state;
    measuring a first voltage/current couple on the second wire including limiting current on the second wire to below a first current threshold during the measuring;
    measuring a second voltage/current couple on the second wire including limiting current on the second wire to below a second current threshold during the measuring;
    calculating a first resistance based on the first couple and the second couple;
    setting the second wire to a high impedance state;
    measuring a third voltage/current couple on the first wire including limiting current on the first wire to below the first current threshold during the measuring;
    measuring a fourth voltage/current couple on the first wire including limiting current on the first wire to below the second current threshold during the measuring;
    calculating a second resistance based on the third couple and the fourth couple;
    evaluating whether at least one of the first wire and the second wire is connected to an erroneously connected element based on the first resistance and the second resistance; and
    terminating the method if a terminal device connected to the communication line goes to an off-hook state.

14. The method according to claim 13, wherein at least one of the measurements comprises setting a voltage on the respective wire and measuring a current on the respective wire.

15. The method according to claim 13, wherein at least one the measurements comprises setting a current on the wire and determining a corresponding voltage of the respective wire.

16. The method according to claim 13 comprising:
    setting the first and the second current thresholds below a threshold for off-hook detection for a terminal device.

17. The method according to claim 13, comprising:
checking whether the communication line is used; and
delaying the measurements until the communication line is not used.

18. The method according to claim 13, comprising:
measuring a third resistance between the first wire and a reference potential;
measuring a fourth resistance between the second wire and a reference potential; and
terminating the method if the third resistance and the fourth resistance correspond to expected resistance values.

19. The method according to claim 13, comprising:
continuously monitoring if the terminal device connected to the communication line goes to an off-hook state.

20. The method according to claim 13, comprising:
calculating a third resistance between a known location and an element erroneously connected to the communication line based on at least one of the first resistance and the second resistance.

21. An apparatus for testing a communication line, the apparatus comprising:
means for measuring voltage/current couples on the communication line;
means for limiting current on the communication line;
means for calculating a resistance based on measured voltage/current couples; and
means for controlling the means for measuring, the means for limiting, and the means for calculating such that, during a line testing, the following is performed:
measuring a first voltage/current couple on the communication line including limiting current on the communication line to below a first current threshold during the measuring;
measuring a second voltage/current couple on the communication line including limiting current on the communication line to below a second current threshold during the measuring;
calculating a resistance based on the first voltage/current couple and the second voltage/current couple; and
terminating the line testing if a terminal device connected to the communication line goes to an off-hook state.

22. The apparatus according to claim 21, wherein during the line testing, the following is performed:
deciding that a connection to an erroneously connected element is present if the resistance is below a threshold value.

23. The apparatus according to claim 22, wherein the threshold value is at least 1 Megaohm.

24. The apparatus according to claim 21, wherein during the line testing, the following is performed:
calculating a further resistance between a known location and an element erroneously connected to the communication line based on the resistance.

25. The apparatus according to claim 24, wherein during the line testing, the following is performed:
calculating a distance between the known location and the erroneously connected element based on the further resistance.

26. The apparatus according to claim 21, wherein during the line testing, the following is performed:
continuously monitoring if the terminal device connected to the communication line goes to an off-hook state.

27. The apparatus according to claim 21, wherein the communication line comprises a pair of wires, wherein during the line testing, the following is performed:
setting one wire of the pair of wires to a high impedance state; and
measuring the first couple and the second couple on the other wire of the pair of wires.

28. The apparatus according to claim 21, wherein the measuring the first couple and measuring the second couple comprises controlling a line card to which the communication line is connected to perform the measuring.

29. An apparatus configured to test a communication line, the apparatus comprising:
at least one adjustable source comprising at least one of an adjustable voltage source and an adjustable current source;
at least one current limiter configured to limit current on the communication line;
at least one meter comprising at least one of a current meter and a voltage meter; and
a control unit operatively coupled to the at least one adjustable source and the at least one meter, the control unit having a test mode, wherein, when the test mode of the control unit is activated, the control unit is configured to control the at least one adjustable source, and the at least one current limiter, and the at least one meter to:
measure a first voltage/current couple on the communication line and limit current on the communication line to below a first current threshold during the measuring of the first voltage/current couple;
measure a second voltage/current couple different from the first couple on the communication line and limit current on the communication line to below a second current threshold during the measuring of the second voltage/current couple;
calculate a resistance based on the first couple and the second couple; and
terminate the test of the communication line if a terminal device connected to the communication line goes to an off-hook state.

30. The apparatus according to claim 29, wherein the at least one adjustable source and the at least one meter are implemented in a line card.

31. The apparatus according to claim 29, wherein the communication line comprises a first wire and a second wire.

32. The apparatus according to claim 29, wherein the measuring comprises setting a voltage and measuring a current.

33. The apparatus according to claim 29, wherein the measuring comprises setting a current and measuring a voltage.

34. The apparatus according to claim 29, wherein the control unit is configured to set the first current and the second current thresholds below a threshold for off-hook detection for a terminal device.

35. A central office equipment comprising:
at least one line card comprising a current limiter configured to limit current on a communication line and a subscriber line interface configured to be coupled to the communication line and a coder/decoder; and
a programmable control unit coupled to the line card and comprising storage configured to store a program comprising a test procedure, wherein, when the test procedure is run, the following is performed:
measure a first voltage/current couple on the communication line and limit current on the communication line to below a first current threshold during the measuring of the first voltage/current couple;
measure a second voltage/current couple on the communication line and limit current on the communication line to below a second current threshold during the measuring of the second voltage/current couple;

calculate a resistance based on the first couple and the second couple; and terminate the test procedure if a terminal device connected to the communication line goes to an off-hook state.

36. The central office equipment according to claim 35, wherein, when the test procedure is run, the following is performed:

determine that a connection to an erroneously connected element is present if the resistance is below a threshold value.

37. The central office equipment according to claim 35, wherein the threshold value is at least 1 Megaohm.

38. The central office equipment according to claim 35, wherein, when the test procedure is run, the following is performed:

calculate a resistance between a known location and an element erroneously connected to the communication line based on the resistance.

39. The central office equipment according to claim 35, wherein, when the test procedure is run, the following is performed:

continuously monitor if the terminal device connected to the communication line goes to an off-hook state.

40. The central office equipment according to claim 35, wherein the communication line comprises a pair of wires, wherein, when the test procedure is run, the following is performed:

set one wire of the pair of wires to a high impedance state; and measure the first couple and the second couple on the other wire of the pair of wires.

* * * * *